United States Patent [19]  [11] Patent Number: 4,708,359
Davenport  [45] Date of Patent: Nov. 24, 1987

[54] TRAILER HITCHING APPARATUS

[76] Inventor: Duke Davenport, 703 N. Birch, Owasso, Okla. 74055

[21] Appl. No.: 947,403

[22] Filed: Dec. 29, 1986

[51] Int. Cl.⁴ .............................................. B60D 1/06
[52] U.S. Cl. .................................................. 280/477
[58] Field of Search ............. 280/477, 478 R; 33/264; 116/28 R

[56] References Cited

U.S. PATENT DOCUMENTS

| | | | |
|---|---|---|---|
| 1,807,379 | 5/1931 | Burrows | 280/477 |
| 3,159,917 | 12/1964 | Whitehead | 280/477 X |
| 3,201,144 | 8/1965 | Smyser | 280/477 |
| 3,363,318 | 1/1968 | Folkins et al. | 280/477 X |
| 3,702,029 | 11/1972 | Anderson, Jr. | 280/477 X |
| 3,765,703 | 10/1973 | Voelkerding et al. | 280/477 |
| 3,867,898 | 2/1975 | Lakamp | 280/477 X |
| 3,889,384 | 6/1975 | White | 280/477 X |
| 3,901,536 | 8/1975 | Black | 280/477 |
| 3,918,746 | 11/1975 | Lehtisaari | 280/477 |
| 4,054,302 | 10/1977 | Campbell | 280/477 |

Primary Examiner—John A. Pekar
Attorney, Agent, or Firm—Henderson & Sturm

[57] ABSTRACT

A trailer hitching apparatus having a pair of vehicle sighting rods attached to each side of the ball on the hitch of the vehicle and extending upwardly so that they are clearly visible to a person when backing up the vehicle. A trailer sighting rod is attached to the tongue of a trailer and extends above a trailer hitch coupling which will extend over the ball of the vehicle hitch when the two are coupled together. Thus, the top extent of the trailer sighting rod and the vehicle rods are designed to be approximately the same when in use. In one embodiment of the invention, an angled loading plate is attached to the hitch on the vehicle and extends upwardly from rear to front and has a load pin guiding rail thereon. An opening is disposed in the angled loading plate directly above the ball of the vehicle hitch. A loading pin is attached to the trailer tongue directly above the trailer hitch coupling which is attached to the tongue and this loading pin extends downwardly. As the vehicle is backed rearwardly, the vehicle driver will guide the vehicle such that the vehicle sighting rods will be on each side of the trailer sighting rod. This will cause the load pin to engage the top of the angled loading plate as the vehicle is backed up and the loading pin guide rail will guide the loading pin into the opening in the angled loading plate. As this is done, the trailer coupling hitch is lifted up over the ball on the vehicle hitch. When the loading pin drops down into the opening in the angled loading plate, the trailer hitch on the tongue will drop down onto the ball of the vehicle hitch.

1 Claim, 2 Drawing Figures

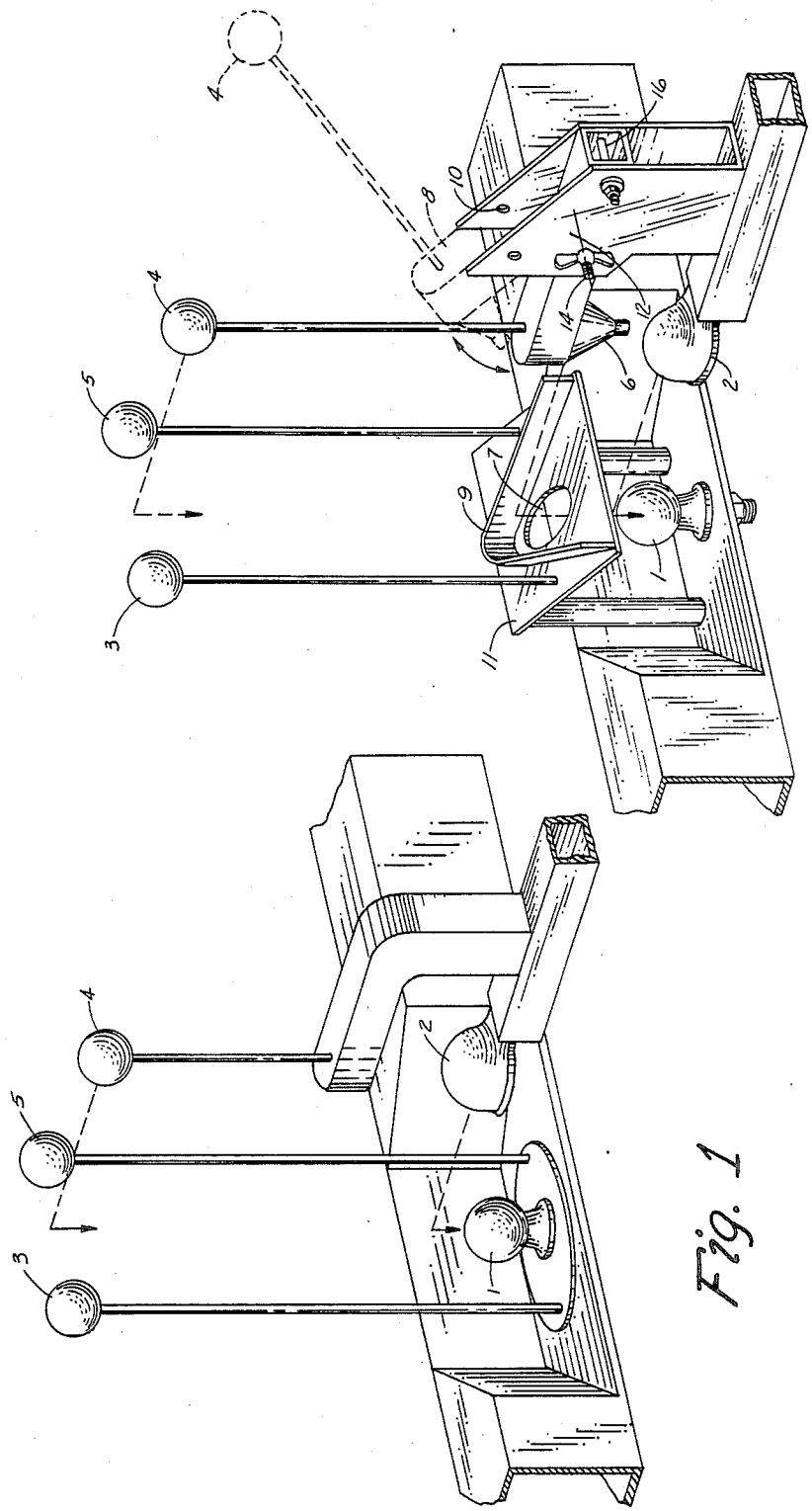

4,708,359

TRAILER HITCHING APPARATUS

TECHNICAL FIELD

The present invention relates generally to trailer hitches and more particularly to a trailer hitching apparatus which permits a vehicle to be backed up so as to align the hitch mechanism of the vehicle with the hitch mechanism of a trailer without requiring that a second person be available to help guide the driver of the vehicle.

BACKGROUND ART

When using a car or a truck having a trailer hitch on the rear thereof to pull a trailer, it is normally difficult, if not impossible, to see the hitching mechanism of the vehicle and the hitching mechanism of the trailer, during the critical time when the rear of the vehicle is close to the hitching mechanism of the trailer. For that reason, it is a common practice for the driver of the vehicle to find a second person to stand near the trailer and guide the vehicle driver so that the hitch of the vehicle will be driven under the hitching mechanism of the trailer. Even with such help, it is extremely difficult to back a vehicle and get it precisely aligned so that the hitch on the vehicle will be exactly in the proper position with respect to the hitching mechanism on the trailer tongue. Of course it is not always possible to have a second person available to direct the vehicle driver so in such a case the vehicle driver must back up by trial and error, getting out of the vehicle and inspecting the relative position of the hitch of the vehicle and the hitching mechanism on the trailer tongue until such hitching process is complete. This, of course, can be a long and frustrating experience.

Others in the prior art have tried to solve the aforementioned problems. For example, U.S. Pat. No. 3,765,703 to Voelkerding, et al proposes to use a pair of vehicle sighting rods and balls extending upwardly on each side of a hitch but somewhat rearwardly thereof. This patent of Voelkerding then also uses a similar trailer sighting rod and ball attached to and above a hitch mechanism on the front of a trailer so that as the vehicle driver backs the vehicle rearwardly toward the hitching mechanism on the trailer, the vehicle sighting rods and balls on the vehicle can be positioned relative to the trailer sighting rod and ball. While this is an excellent approach to the problem, because the vehicle sighting rods and balls are not lined up with the ball hitch on the vehicle, the hitching mechanism on the trailer will not drop down over the ball hitch on the vehicle even after the vehicle sighting rods and balls are positioned so that the trailer sighting rod and ball is directly between them. Furthermore, it is extremely difficult to align the hitch mechanism on the trailer tongue from side to side directly over the ball of the vehicle hitch. This problem is exacerbated when the trailer tongue is too heavy for the user to lift up, pull to one side or the other, or to pull the trailer forwardly or rearwardly.

Consequently, there is a need for a trailer hitching apparatus which will overcome the aforementioned problems with the prior art.

DISCLOSURE OF THE INVENTION

The present invention relates to a trailer hitching apparatus having a pair of vehicle sighting rods attached to each side of the ball on the hitch of the vehicle and extending upwardly so that they are clearly visible to a person when backing up the vehicle. A trailer sighting rod is attached to the tongue of a trailer and extends above a trailer hitch coupling which will extend over the ball of the vehicle hitch when the two are coupled together. Thus, the top extent of the trailer sighting rod and the vehicle rods are designed to be approximately the same when in use.

In one embodiment of the invention, an angled loading plate is attached to the hitch on the vehicle and extends upwardly from rear to front and has a load pin guiding rail thereon. An opening is disposed in the angle loading plate directly above the ball of the vehicle hitch. A loading pin is attached to the trailer tongue directly above the trailer hitch coupling which is attached to the tongue and this loading pin extends downwardly. As the vehicle is backed rearwardly, the vehicle driver will guide the vehicle such that the vehicle sighting rods will be on each side of the trailer sighting rod. This will cause the loading pin to engage the top of the angled loading plate as the vehicle is backed up and the loading pin guide rail will guide the loading pin into the opening in the angled loading plate. As this is done, the trailer coupling hitch is lifted up over the ball on the vehicle hitch. When the loading pin drops down into the opening in the angled loading plate, the trailer hitch on the tongue will drop down onto the ball of the vehicle hitch.

The present invention relates to an improved trailer hitching apparatus.

Another object of the present invention relates to an improved trailer hitching apparatus which can be used by one person to align and couple a ball hitch on a vehicle with a complementary hitch structure on a trailer tongue.

Another object of the present invention is to provide an angled loading plate and loading opening having a guide rail therearound so that once a vehicle driver gets the vehicle portion of the hitch close to the trailer tongue portion of the hitch mechanism, merely continuing to back the vehicle toward the trailer will automatically couple the trailer tongue portion of the hitch into the vehicle ball portion of the hitch.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a preferred embodiment of the present invention; and FIG. 2 is a perspective view of another of the preferred embodiments of the present invention.

BEST MODES FOR CARRYING OUT THE INVENTION

Referring now to the drawings wherein like reference numerals designate identical or corresponding parts throughout the several views, FIG. 1 shows a trailer hitching apparatus constructed in accordance with the present invention. The ball (1) is attached to a vehicle bumper as shown in FIG. 1 and a pair of vehicle sighting rods and balls (3) and (5) are rigidly attached to each side of the vehicle ball hitch (1). A trailer tongue is also shown in FIG. 1 having a cup-shaped member (2) for fitting over the ball (1) in a conventional manner.

The mechanism for locking the cup-shaped member (2) onto the ball (1) is not shown because these mechanisms are well known in this art. A trailer sighting rod and ball (4) is attached to the trailer tongue by a rigid L-shaped member welded to the trailer tongue as can readily be appreciated by viewing FIG. 1.

The operation for using the trailer hitching apparatus of FIG. 1 is that the trailer tongue is adjusted upwardly so that the trailer hitch coupling (2) is at a level just above the level of the ball (1) and wherein the vehicle and trailer sighting balls (3), (4) and (5) will be at approximately the same height and visible to the vehicle driver while backing up the vehicle attached to the bumper shown in FIG. 1.

Preferably, the sighting balls (3) and (5) will be of one color and the trailer sighting ball (4) will be of a different color so as to be able to distinguish between them. The driver of the towing vehicle will then back toward the towed vehicle tongue keeping the ball (4) visually in the center and between the balls (3) and (5). The vehicle is stopped when the ball (4) appears directly between the balls (3) and (5). The vehicle driver would then come back to check to see if the trailer hitch coupling (2) is directly over the ball hitch (1), which it will be if the ball (4) is directly between the balls (3) and (5). The tongue of the trailer is then lowered and the cup-shaped portion of the hitch (2) will drop directly down over the ball (1). The cup-shaped member (2) is then locked on in a conventional fashion and the driver may then continue whatever steps are necessary to make the hookup ready for travelling on the road.

Referring now to FIG. 2, it is noted that the hitching mechanism shown therein has an angled loading plate (11) rigidly secured to the bumper and hitch housing by a pair of vertical members welded to the rear thereof and welded to the bottom thereof to the bumper. These vertical members can be attached other than by welding, such as by bolting, to angled loading plate (11). The loading plate (11) is lower at the rear thereof than at the front thereof and has a loading pin guide rail (9) welded thereto for reasons which will be explained below. The vehicle sighting rods and balls (3) and (5) are secured to the top of the angle loading plate (11).

A loading pin (6) is secured to the bottom of an arm which is pivotally attached by a pin (16) to a housing extending upwardly from and attached to the tongue of the vehicle. A pin (14) also extends through the bracket and arm that the pin (16) extend through. A trailer sighting rod and ball (4) extends directly above the loading pin (6) and is rigidly attached to the same arm (8) that the loading pin (6) is attached to.

In operation, the hitching apparatus of FIG. 2 would be utilized by first elevating the trailer tongue to which a cup-shaped mechanism (2) is attached to just high enough to be raise the bottom of loading pin (6) so it will clear the lowest part of the angled loading plate (11). The vehicle driver then uses the vehicle sighting rods and balls (3) and (5) and backs the vehicle rearwardly so as to try to position the trailer sighting rod ball (4) directly between the vehicle sighting rod balls (3) and (5). As in the FIG. 1 embodiment, the trailer ball (4) will be of a different color than the vehicle balls (3) and (5). As the driver of the towing vehicle backs toward the towed vehicle, keeping the ball (4) in sight and between the balls (3) and (5), the loading pin will engage the top rear portion of angled loading plate (11). Continuing to back the towing vehicle will cause the loading pin (6) to be guided upwardly toward the opening (7) in the loading plate (11).

If the loading pin (6) is on one side or the other of the opening (7), but between the lower portion of the rail (9), the loading pin rail will force the loading pin (6) toward the opening (7). This action lifts the trailer hitch coupling (2) up and over the ball hitch (1). As the driver continues to back up, the loading pin (6) is guided by the loading pin guide rail (9) until the loading pin (6) drops into the opening (7). This puts the trailer hitch coupling (2) directly on top of and over the vehicle ball hitch (1) and the towed vehicle is attached to the towing vehicle.

The vehicle driver would then come back to the hitch, and remove the wing nut off of the bolt (14), remove the bolt (14), and swing the loading arm (8) upwardly around the pivot pin (16) and align the hole in the loading arm (8) with holes (10) in the top of bracket (12). Then the locking bolt (14) is again extended through the loading arm (8) and holes (10) in bracket (12) so that the loading arm (8) and trailer sighting rod and ball (4) will be held in the position shown in dashed lines in FIG. 2 during such time that the vehicle is being towed from place to place. The driver may then continue to take whatever steps are necessary to make the hookup ready for travel.

Obviously, many modification and variations of the present invention are possible in light of the above teachings. It is therefore to be understood that, within the scope of the appended claims, the invention may be practiced otherwise than as specifically described.

I claim:

1. An improved trailer hitching apparatus comprising:

a trailer tongue adapted to be attached to a trailer;
   means attached to the front of said tongue for selectively extending over and holding a ball;
   a loading arm disposed above said tongue;
   bracket means for operatively attaching said loading arm to said tongue;
   means attached to said bracket means for operatively pivotally attaching a front portion of said loading arm to said bracket means;
   means operatively attached to said bracket means for holding said loading arm in either a substantially horizontal position or a position wherein the front of said loading arm is a substantial distance above the rear end thereof;
   loading pin means disposed on the front underside of said loading arm, said loading pin means being frusto-conical with a smaller portion thereof extending downwardly from a larger portion thereof;
   a trailer sighting rod attached at the bottom thereof to a front portion of said loading arm and having an upper end;
   first enlarged means at the top of said sighting rod for viewing from the driver's seat of a vehicle;
   a housing adapted to be attached to a vehicle;
   a ball attached at the bottom thereof to said housing;
   a loading plate attached at a front end thereof to said housing and disposed above said ball, said loading plate being lower at the rear thereof than at the front;
   opening means disposed centrally through said loading plate for receiving said loading pin means therein;
   guide means attached to the top of said loading plate and extending around said opening means to a rear portion of said loading plate, said guide means being wider at the rear thereof than at the front thereof where it surrounds the opening means, for guiding the loading pin into said opening means;

a first vehicle sighting rod operatively attached at the bottom thereof to said loading plate on one side of said opening means;

second enlarged means at the top of said first vehicle sighting rod for viewing from the driver's seat of the vehicle;

a second vehicle sighting rod operatively attached at the bottom thereof to said loading plate on the other side of said opening means; and a third enlarged means at the top of said first vehicle sighting rod for viewing from the driver's seat of a vehicle whereby the driver of a vehicle can guide the vehicle so as to position the second and third enlarged means operatively attached to the vehicle hitch housing to each side respectively of the first enlarged means, which is operatively attached to the trailer tongue, thereby causing the loading pin means to drop into the opening means and the ball holding means to simultaneously drop down over the ball.

* * * * *